Patented Jan. 18, 1944

2,339,300

UNITED STATES PATENT OFFICE 2,339,300

REFRIGERANT COMPOSITION

Robert B. Taylor, near Knoxville, Tenn., assignor to Tennessee Valley Authority, a corporation of the United States of America No Drawing. Application December 24, 1941, Serial No. 424,239

2 Claims. (Cl. 99—193)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of preservation of comestibles, particularly by the direct contact of the comestibles with a refrigerant solution until the same is frozen, and thereafter storing the comestibles in the frozen condition.

The principal object of this invention is to provide a process for the treatment of comestibles which have a composition such that they readily discolor in storage. Another object of this invention is to provide a process which may not only be adapted to prevent the deterioration of those comestibles which are readily discolored on storage, but also may be adapted for use with other comestibles which are not so susceptible to discoloration without requiring a change of refrigerant solution when the various types of comestibles are processed successively. Other objects of this invention include the provision for an effective and economical method for the preservation of comestibles and the prevention of serious discoloration in comestibles susceptible to it on extended storage in a frozen state.

The present invention is directed to a process of freezing and preserving a comestible having a composition such that it normally discolors readily when stored in a frozen condition by preparing a refrigerant solution suitable for freezing said comestible in direct contact therewith, adjusting the hydrogen ion concentration of said refrigerant solution within a range adapted to prevent said discoloration by the addition of a material selected from the group consisting of an edible acid and an edible alkali, by contacting said comestible with resulting refrigerant solution maintained at a temperature below the freezing point of said comestible until said comestible is frozen, by separating the frozen comestible from said refrigerant solution, and by storing said comestible at a temperature to maintain the same in the frozen condition.

It is evident that there are numerous factors which will influence conditions for the most satisfactory operation of the present invention, the actual limits of which cannot be established except by a detailed study of each refrigerant and each comestible involved and the specific conditions applied during the freezing and storing of the respective comestibles.

This invention is directed to the preservation of comestibles which, even in the frozen state, discolor rather rapidly in storage. The more important comestibles which have compositions such that this characteristic of discoloration on storage is particularly noticeable and undesirable include peaches, apples, cherries, and apricots. In the group of comestibles specifically mentioned, peaches appear to be most seriously affected by discoloration in storage, even in the frozen state. While this problem of discoloration is generally most serious when the preservation of fruits is involved, it nevertheless exists to an appreciable extent in connection with the preservation of certain vegetables, such as green beans, lima beans, and peas.

Any refrigerant solution suitable for direct contact with a comestible to be frozen is a proper material for use in connection with the present invention. Aqueous refrigerant solutions of both inorganic and organic compounds which are generally accepted as edible are usually used for direct contact with comestibles. Solutions containing ethanol, glycerol, invert sugar and sodium chloride are specific types of solutions which are used for this purpose.

It has been discovered that such aqueous solutions may have the hydrogen ion concentration thereof adjusted to the proper value to prevent the discoloration of comestibles referred to above when such refrigerant compositions are used in direct contact with such comestibles. Generally, those comestibles which are naturally acidic require the adjustment of the hydrogen ion concentration to a value substantially below the neutral value of 7. Such adjustment can be made most satisfactorily by using an edible acidic material which is non-oxidizing, such as hydrochloric acid, phosphoric acid, and sulfuric acid, and fruit acids such as citric acid, malic acid and tartaric acid. The acidity of the final refrigerant compositions used in the process may be varied, depending upon the conditions under which such a composition is used and the susceptibility of the particular comestible being preserved to discoloration on storage. Usually the acidity of the refrigerant composition should be such that its pH value is about 3 to 6 to prevent such discoloration, with a pH value of about 5 being generally preferred. In contra-distinction, it has been found that generally those comestibles which are naturally substantially neutral or slightly alkaline require the adjustment of the hydrogen ion concentration to a value slightly above the neutral value of 7. The edible alkaline material which is suitable for adjusting the hydrogen ion concentration of the refrigerant composition used includes alkali metal carbonates and hydroxides, with the alkali metal carbonates or bicarbonates being generally preferred. Usually, the alkalinity of a refrigerant composition for use in contact with this particular type of comestible should have a pH value between 7 and about 8, with a pH value of the order of 8 generally preferred.

Under circumstances such that an invert sugar refrigerant solution is to be prepared by the inversion of sucrose in the presence of an acidic material, the final composition of desired hydrogen ion concentration may be obtained either by the use of substantially the exact amount of the acidic material required for such inversion and, at the same time, produce the correct hydrogen ion concentration in the resulting invert sugar solution, or by adjusting the residual acidity of the invert sugar solution so produced by the addition of a suitable edible alkalizing material to the proper hydrogen ion concentration, whether the latter be for a value above or below 7 as required.

After freezing the comestible in direct contact with a refrigerant composition of the proper hydrogen ion concentration to prevent discoloration of the comestible on storage, the frozen comestible and refrigerant solution are so separated that substantially all of the refrigerant solution is removed from the comestible. Subsequently, the frozen comestible is stored at a temperature satisfactory to maintain the comestible in a frozen condition without any appreciable deterioration which may be derived from the effect of the temperature of the storage alone.

It will be seen, therefore, that this invention actually may be carried out by the use of various modifications and changes without departing from its spirit and scope.

This application is a continuation-in-part of my application Serial No. 288,346, filed August 4, 1939.

I claim:

1. A process of freezing and preserving a comestible, selected from the group consisting of fruits and vegetables, with acidic characteristics and having a composition such that it normally discolors readily when stored in a frozen condition, which comprises (a) preparing an aqueous invert sugar refrigerant solution suitable for freezing said comestible in direct contact therewith by inverting sucrose with an acid inverting agent and neutralizing the acid in the invert sugar solution so formed to a hydrogen ion concentration adapted to prevent said discoloration, (b) containing said comestible with resulting refrigerant solution maintained at a temperature below the freezing point of said comestible until said comestible is frozen, (c) separating the frozen comestible from said refrigerant solution, and (d) storing said comestible at a temperature to maintain the same in the frozen condition.

2. A process of freezing and preserving a comestible, selected from the group consisting of fruits and vegetables, with acidic characteristics and having a composition such that it normally discolors readily when stored in a frozen condition, which comprises (a) preparing an aqueous invert sugar refrigerant solution by inverting sucrose with an edible acid inverting agent in substantially the amount required for acidifying the resulting invert sugar solution to the extent adapted to prevent said discoloration, (b) contacting said comestible with resulting refrigerant solution maintained at a temperature below the freezing point of said comestible until said comestible is frozen, (c) separating the frozen comestible from said refrigerant solution, and (d) storing said comestible at a temperature to maintain the same in the frozen condition.

ROBERT B. TAYLOR.

CERTIFICATE OF CORRECTION.

Patent No. 2,339,300. January 18, 1944.

ROBERT B. TAYLOR.

It is hereby certified that error appears in the printed specification of the above numbered patent requiring correction as follows: Page 2, second column, line 13, claim 1, for "containing" read --contacting--; and that the said Letters Patent should be read with this correction therein that the same may conform to the record of the case in the Patent Office.

Signed and sealed this 29th day of February, A. D. 1944.

Leslie Frazer (Seal)                    Acting Commissioner of Patents.